United States Patent
Wu et al.

(10) Patent No.: US 11,647,163 B2
(45) Date of Patent: May 9, 2023

(54) METHODS AND SYSTEMS FOR OBJECT MONITORING

(71) Applicant: ZHEJIANG DAHUA TECHNOLOGY CO., LTD., Zhejiang (CN)

(72) Inventors: Huimin Wu, Hangzhou (CN); Wei Li, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 144 days.

(21) Appl. No.: 16/989,822

(22) Filed: Aug. 10, 2020

(65) Prior Publication Data

US 2020/0374492 A1 Nov. 26, 2020

Related U.S. Application Data

(63) Continuation of application No. 16/285,440, filed on Feb. 26, 2019, now Pat. No. 10,742,936, which is a
(Continued)

(30) Foreign Application Priority Data

Aug. 26, 2016 (CN) .......................... 201610737804.9

(51) Int. Cl.
*H04N 7/18* (2006.01)
*G08B 13/196* (2006.01)
(Continued)

(52) U.S. Cl.
CPC ........... *H04N 7/181* (2013.01); *G08B 13/196* (2013.01); *H04N 5/23218* (2018.08); *H04N 5/247* (2013.01)

(58) Field of Classification Search
CPC .... H04N 7/181; H04N 5/23218; H04N 5/247; G08B 13/196
See application file for complete search history.

(56) References Cited

U.S. PATENT DOCUMENTS 7,136,524 B1 * 11/2006 Goh ....................... G06V 10/56
382/167
7,777,783 B1 8/2010 Chin et al.
(Continued)

FOREIGN PATENT DOCUMENTS

CN 101572804 A 11/2009
CN 101616309 A 12/2009
(Continued)

OTHER PUBLICATIONS

International Search Report in PCT/CN2017/09/488 mailed on Novembers, 2 017, 3 pages.
(Continued)

*Primary Examiner* — Joseph W Becker
(74) *Attorney, Agent, or Firm* — Metis IP LLC

(57) ABSTRACT

According to various aspects of the present disclosure, methods, systems, and media for object tracking are provided. In some embodiments, the systems may include: at least one hardware processor to: detect a target object in first image data provided by a first camera; determine a first plurality of neighboring cameras of the first camera that have detected the target object; determine at least one of the first plurality of neighboring cameras as a next node of the first camera; and generate first topological data for the first camera and the next node of the first camera.

18 Claims, 12 Drawing Sheets

Related U.S. Application Data continuation of application No. PCT/CN2017/097488, filed on Aug. 15, 2017.

(51) Int. Cl.
  *H04N 5/232*  (2006.01)
  *H04N 5/247*  (2006.01)

(56) References Cited

U.S. PATENT DOCUMENTS

| | | |
|---|---|---|
| 8,300,102 B2 | 10/2012 | Nam et al. |
| 2004/0257444 A1 | 12/2004 | Maruya et al. |
| 2009/0268033 A1 | 10/2009 | Ukita |
| 2016/0189500 A1 | 6/2016 | Kim et al. |
| 2016/0198128 A1 | 7/2016 | Wang et al. |
| 2019/0238798 A1 | 8/2019 | Liu et al. |

FOREIGN PATENT DOCUMENTS

| | | |
|---|---|---|
| CN | 102065279 A | 5/2011 |
| CN | 102176246 A | 9/2011 |
| CN | 102638675 A | 8/2012 |
| CN | 102724482 A | 10/2012 |
| CN | 102724773 A | 10/2012 |
| CN | 105472333 A | 4/2016 |

OTHER PUBLICATIONS

Written Opinion in PCT/CN2017/097488 mailed on Novembers, 2017, 4 pages.
First Office Action in Chinese Application No. 201610737804.9 mailed on Aug. 31, 2018, 29 pages.
The Fourth Office Action in Chinese Application No. 201610737804.9 mailed on Oct. 28, 2018, 25 pages.
The Extended European Search Report in European Application No. 17842828.0 mailed on July 3, 2 019, 8 pages.

* cited by examiner

METHODS AND SYSTEMS FOR OBJECT MONITORING

CROSS REFERENCE TO RELATED APPLICATION

This application is a continuation of U.S. patent application Ser. No. 16/285,440, filed on Feb. 26, 2019, which is a continuation of International Application No. PCT/CN2017/097488, filed on Aug. 15, 2017, which in turn claims priority to Chinese Patent Application No. 201610737804.9, filed on Aug. 26, 2016, the contents of each of which are hereby incorporated by reference.

TECHNICAL FIELD

The present disclosure generally relates to computer vision, and more particularly, to a system and method for object tracking and monitoring using camera network topologies.

BACKGROUND

A surveillance system can use one or more cameras to track and monitor objects. For example, the cameras can monitor an area and capture videos of the area. The video surveillance system can process the videos of the area for object tracking and/or monitoring (e.g., using image processing techniques). Such a surveillance system is widely used in various fields, such as security, traffic monitoring, military, etc.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

According to an aspect of the present disclosure, a system for object tracking is disclosed. The system may include: at least one hardware processor to: detect a target object in first image data provided by a first camera; determine a first plurality of neighboring cameras of the first camera that have detected the target object; determine at least one of the first plurality of neighboring cameras as a next node of the first camera; and generate first topological data for the first camera and the next node of the first camera.

In some embodiments, to generate the first topological data for the first camera and the next node of the first camera, the hardware processor is further to: determine a motion direction of the target object in a first field of view of the first camera; and generate the first topological data based on the motion direction.

In some embodiments, the hardware processor is further to: divide the first field of view into a plurality of regions; determine that the target object departs from the first field of view via a first region of the plurality of regions; and generate the first topological data based on the first region.

In some embodiments, each of the first plurality of neighboring cameras is connected to the first camera via a threshold number of intermediate devices.

In some embodiments, to determine at least one of the first plurality of neighboring cameras as the next node of the first camera, the hardware processor is further to: acquire a first plurality of time instances corresponding to the target object entering a plurality of fields of view of the first plurality of neighboring cameras; select, from the first plurality of time instants, a first time instant; determine a first neighboring camera of the first plurality of neighboring cameras corresponding to the first time instant; and determine the first neighboring camera as the next node of the first camera.

In some embodiments, the first time instant is earlier than at least one other time instant of the first plurality of time instants.

In some embodiments, the hardware processor is further to: determine that a second time instant is the same as a third time instant, wherein the first plurality of time instants comprises the second time instant and the third time instant; and selecting, from the first plurality of neighboring cameras, a second plurality based on the second time instant and the third time instant.

In some embodiments, the hardware processor is further to determine that each of the second time instant and the third time instant is earlier than at least one other time instant of the first plurality of time instants.

In some embodiments, the hardware processor is further to: acquire a second plurality of time instances corresponding to departure from a second plurality of fields of view of each of the second plurality of neighboring cameras by the target object; selecting, from the second plurality of time instants, a fourth time instant; and determine the next node of the first camera based on the fourth time instant.

In some embodiments, the fourth time instant is later than at least one other time instant of the second plurality of time instants.

In some embodiments, the hardware processor is further to: determine, for each of the second plurality of neighboring cameras, an amount of image data relating to the target object; and determine the next node of the first camera based on the comparison.

In some embodiments, the hardware processor is further to: detect at least one object based on image data provided by each of the second plurality of neighboring cameras; compare at least one feature of the detected object and at least one feature of the target object to determine similarities between the detected object and the target object; and determine the next node of the first camera based on the comparison.

In some embodiments, to determine a plurality of neighboring cameras of the first camera that have detected the target object, the hardware processor is further to: acquire second image data provided by the first plurality of neighboring cameras; and determine that the first plurality of neighboring cameras of the first camera have detected the target object based on the second image data.

In some embodiments, the hardware processor is further to: generate second topological data for a plurality of cameras based on the first topological data for the first camera and the next node of the first camera.

In some embodiments, to determine the first plurality of neighboring cameras of the first camera, the hardware processor is further to: receive, from at least one of the first plurality of cameras, a response indicative of detection of the target object, wherein the response is responsive to a request for tracking the target object; and determine the first plurality of neighboring cameras based on the response.

In some embodiments, the hardware processor is further to: acquire at least a feature of the target object based on the request for tracking the target object.

In some embodiments, the response includes at least one of a first timestamp corresponding to entry into a second field of view of at least one of the first plurality of neighboring cameras by the target object or a second time timestamp corresponding to departure from the second field of view by the target object.

In some embodiments, the hardware processor is further to: send, to the next node of the first camera, a request for tracking the target object; and receive, from the next node of the first camera, a response.

In some embodiments, the response includes information related to detection of the target object based on at least a feature of the target object.

In some embodiments, the response includes an indication of detection of the target object.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
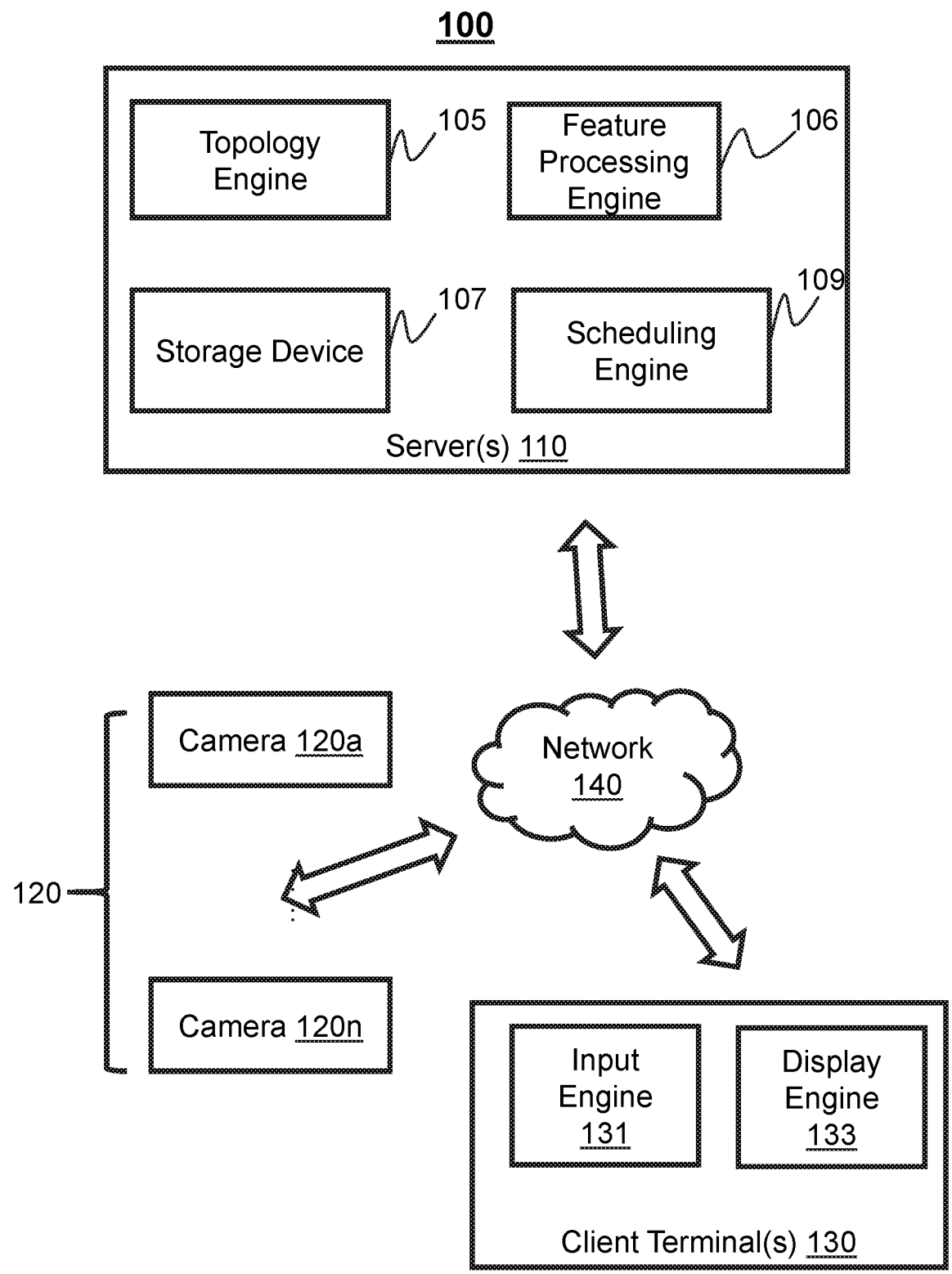
FIG. 1 is a block diagram illustrating an exemplary monitoring system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, modules, systems, devices, and/or drivers have been described at a relatively high-level, without detail, in order to avoid unnecessarily obscuring aspects of the present disclosure.

Aspects of the disclosure provide for mechanisms (e.g., methods, systems, and media) for object tracking and monitoring using camera network topologies. A surveillance system of multiple cameras can perform relay tracking of an object based on positioning information of the cameras. Prior solutions for object tracking schedule the cameras to perform object tracking tasks based on positioning information provided by GPS (Global Positioning System) devices and/or GIS (Geographic Information System) devices. As such, the prior solutions may have to be implemented using cameras with built-in GPS and/or GIS devices. Moreover, the prior solutions may not be able to track objects when positioning information of the cameras are not available due to technique failures of the GPS and/or the GIS. Furthermore, the positioning information of the cameras alone may not be sufficient for accurate object tracking.

Aspects of the disclosure address the above deficiencies by providing mechanisms for estimating topological data of a camera system and performing object tracking and/or monitoring based on the topological data. For example, the mechanisms can determine motion information of an object (e.g., a motion direction of the object). The mechanisms can then determine topological data for the camera system based on the motion information of the object for tracking the object using multiple cameras of the camera system. The mechanisms disclosed herein may be used in various applications, such as security applications, surveillance systems (e.g., a baby monitor that monitors acts of a baby), traffic control applications, etc.

As referred to herein, image data may include any data about one or more images, such as one or more pixel values (e.g., gray values, intensities, color components, luminance, etc. of one or more pixels of an image), coding parameters (e.g., motion vectors, bitrates, and/or any other parameter that can be used to encode and/or decode one or more images), display parameters (e.g., presentation timestamps), etc.

As referred to herein, an image may refer to a still image, a moving image (e.g., a video frame), a thermal image (e.g., a thermal still image, a thermal video frame, etc.), and/or any other suitable image. An image can have any suitable size and/or shape. For example, an image can be a frame, a field, or any suitable portion of a frame or a field, such as a slice, a block, a macroblock, a set of macroblocks, a coding tree unit (CTU), a coding tree block (CTB), etc. An image may be a two-dimensional (2D) image, a three-dimensional (3D) image, etc.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "module," and/or "unit" used herein are one method to distinguish different components, elements, parts, section or assembly of different level in ascending order. However, the terms may be displaced by other expression if they may achieve the same purpose.

It will be understood that when a device, unit, or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

For persons having ordinary skills in the art, a certain amount of variations, changes and/or modifications may be deducted under guidance of the present disclosure. Those variations, changes and/or modifications do not depart from the scope of the present disclosure.

FIG. 1 is a block diagram illustrating an exemplary monitoring system 100 according to some embodiments of the present disclosure. As illustrated, monitoring system 100 may include one or more servers 110, cameras 120, client terminals 130, a network 140 and/or any other suitable components for performing object tracking and/or monitoring. In some embodiments, server 110 and client terminal 130 may be integrated as a single device. Alternatively, camera(s) may be installed at a remote location from center sever 110 and/or the client terminal 130.

Server(s) 110 may be configured to perform object detection, tracking, and/or monitoring. For example, server(s) 110 can generate a topology structure of camera(s) 120 and process data. In some embodiments, the data may include image data, video data, features of objects, instructions, or the like, or any combination thereof. In some embodiments, the data may be analog or digital. In some embodiments, server 110 may generate a control signal including, for example, a control signal for camera(s) to acquire image data, a control signal for identifying an object in the image data, a control signal for storing and/or processing data, a control signal for transmitting data among components of monitoring system 100, or the like, or any combination thereof. In some embodiments, the control signal may be generated based on data received from cameras 120, a client terminal 130, and/or user inputs.

In some embodiments, server 110 may include a topology engine 105, feature processing engine 106, storage device 107, and/or any other suitable component for processing data. In some embodiments, topology engine 105 may be configured to construct a topology structure for cameras 120. In some embodiments, the topology structure may be constructed based on geographical locations and fields of view (FOVs) of the cameras 120. For example, when a target object leaves the FOV of a first camera and enters the FOV of a second camera, the second camera may be a next node of the first camera in the topology structure. In some embodiments, topology engine 1045 can generate topological data for a camera system by performing one or more operations described in connection with FIGS. 6-12.

In some embodiments, feature processing engine 106 may be configured to process features of one or more objects. For example, feature processing engine 106 may process image data, extract features of objects based on the image data, analyze the features, and/or compare the extracted features with features of other objects. Feature processing engine 106 can transmit the features to cameras 120 and/or client terminal 130. A feature of an object may include any data that can represent one or more portions of the object, such as image data (e.g., one or more pixel values, images), vectors, etc. In some embodiments, different features can be extracted for different objects. For example, features of a vehicle may be a color, a license plate number, a motion direction, a location, a speed, or the like, or any combination thereof. As another example, features of a person may include one or more facial features (e.g., positional information or any other information of eyes, ears, nose and/or mouse) and physical characteristics (e.g., height, body figures, walking gesture and/or hair styles), etc.

In some embodiments, the storage device 107 may be configured to store data. The data may include topological data, features of objects, geographical locations of cameras 120, identifications of cameras 120, control signals, instructions, image data, programs, or the like, or any combination thereof. In some embodiments, the storage device 107 may include a mass storage, a removable storage, a volatile read-and-write memory, a read-only memory (ROM), or the like, or any combination thereof. For example, the mass storage may include a magnetic disk, an optical disk, a solid-state drive, etc.

In some embodiments, the server 110 may include a scheduling engine 109 for synchronization of data among various components of the system 100 (e.g., the server(s) 110, the cameras 120).

Each of the cameras 102 (e.g., cameras 102a, ..., 102n) may be and/or include any suitable device that is capable of acquiring image data, such as a camera, a video recorder, a scanner, a mobile telephone, a tablet computing device, a wearable computing device, an infrared imaging device (e.g., a thermal imaging device), and/or any other suitable device that can acquire image data. In some embodiments, the camera(s) 102 may include a monocular camera, a binocular camera, etc. In some embodiments, the camera may be a visible light camera or a thermal imaging camera. The camera(s) 102 may include a charge-coupled device (CCD), a complementary metal-oxide-semiconductor (CMOS) sensor, an N-type metal-oxide-semiconductor (NMOS), a contact image sensor (CIS), and/or any other suitable imaging sensor.

In some embodiments, camera(s) 120 may be part of a medical imaging equipment, a night vision equipment, a radar system, a sonar system, a security system, a camcorder, a thermal camera, a mobile phone, a tablet computing device, a laptop, a wearable device (e.g., 3D glasses), a robot, or the like, or any combination thereof. Camera(s) 120 may also include an optical sensor, a radio detector, an artificial retina, a mirror, a telescope, a microscope, or the like, or any combination thereof.

In some embodiments, camera(s) 120 may monitor an area and capture image data relating to one or more objects. The object may include a vehicle, a person (e.g., a baby), an animal, or the like, or any combination thereof. In some embodiments, multiple cameras 120 may acquire image data of the area at the same time or at different times. Each of cameras 120 may have a field of view (FOV) that may or may not be adjustable. The FOV may be adjusted by adjusting the position, orientation, etc. of the camera. Multiple FOVs of multiple cameras 120 (e.g., cameras 102a and 102n) may or may not be the same. Multiple FOVs of multiple cameras 120 (e.g., cameras 102a and 102n) may or may not overlap with each other.

In some embodiments, a camera 120 may transmit image data to center sever 110, client terminal 130, and/or one or more other cameras.

In some embodiments, each of the cameras 120 may include a topology engine and/or a feature processing engine (not shown in FIG. 1). The topology engine can perform any operation as described in connection with the topology engine 105. The feature processing engine can perform any operation as described in connection with the feature processing engine 106. Furthermore, the cameras 120 may include a scheduling engine (not shown) for synchronization with server 110.

Client terminal 130 may be configured to facilitate user interactions with system 100. For example, client terminal 130 can include an input engine 131 for receiving one or more user inputs, such as a user selection of image data (e.g., one or more images, image regions), a user selection and/or identification of an object, etc. As another example, client terminal 130 may include a display engine 133 for displaying image data and/or any other data. The display engine 133 can display the image data on a display.

In some embodiments, client terminal 130 may include a mobile device, a tablet computer, a laptop computer, or the like, or any combination thereof. In some embodiments, the mobile device may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc.

Network 140 may be configured to facilitate communications among the components of monitoring system 100 including server 110, cameras 120, client terminal 130 and/or any other components of the monitoring system 100. For example, network 140 may transmit data from camera(s) to server 110. As another example, network 140 may transmit instruction from client terminal 130 to server 110.

In some embodiments, network 140 may include a wired network, a wireless network, or any connection capable of transmitting and receiving data. In some embodiments, the wired network may include a connection using a metal cable, an optical cable, a hybrid cable, or the like, or any combination thereof. In some embodiments, the wireless network may include a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof. In some embodiments, server 110, cameras 120, client terminal 130, or network 140 may be connected to or communicate with each other directly or indirectly.

Each of server(s) 110, camera(s) 120, and client terminal(s) 130 may include one or more processors to perform operations in accordance with the present disclosure. The processors may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. In some embodiments, each of server(s) 110, camera(s) 120, and client terminal(s) 130 can be.

Each of camera(s) 120, and client terminal(s) 130 can be implemented as a standalone device or be integrated with one or more other components of system 100. In some embodiments, two or more components of server(s) 110, camera(s) 120, client terminal(s) 130, and network 140 may be integrated with each other. For example, server 110 and client terminal 130 may be integrated as one device. As another example, server 110 and cameras 120 may be integrated as a one device. In some embodiments, one or more of the above components may be located remote from each other. Merely by way of example, server 110 may be implemented on a cloud platform (e.g., a cloud computing platform or cloud storing platform). As another example, cameras 120 may be controlled by a remote system (e.g., a remote monitoring system or a remote security system).

It should be understood that, the component of monitoring system 100 illustrated in FIG. 1 may be implemented via various ways. For example, the components may be implemented through hardware, software, or a combination thereof. Herein, the hardware may be implemented by a dedicated logic; the software may be stored in the storage, the system may be executed by proper instructions, for example, by a microprocessor or a dedicated design hardware. Those skilled in the art can understand that, the methods and systems described in this disclosure may be implemented by the executable instructions of a computer and/or by control code in the processor, for example, the code supplied in a carrier medium such as a disk, a CD, a DVD-ROM, in a programmable storage such as a read-only memory, or in a data carrier such as optical signal carrier or electric signal carrier. The systems and the methods in the present application may be implemented by a hardware circuit in a programmable hardware device in a ultra large scale integrated circuit, a gate array chip, a semiconductor such as a transistor, a field programmable gate array, a programmable logic device, software, firmware, or a combination thereof.

It should be noted that the above description of monitoring system is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, client terminal 130 may be integrated in server 110.

Figure 2:
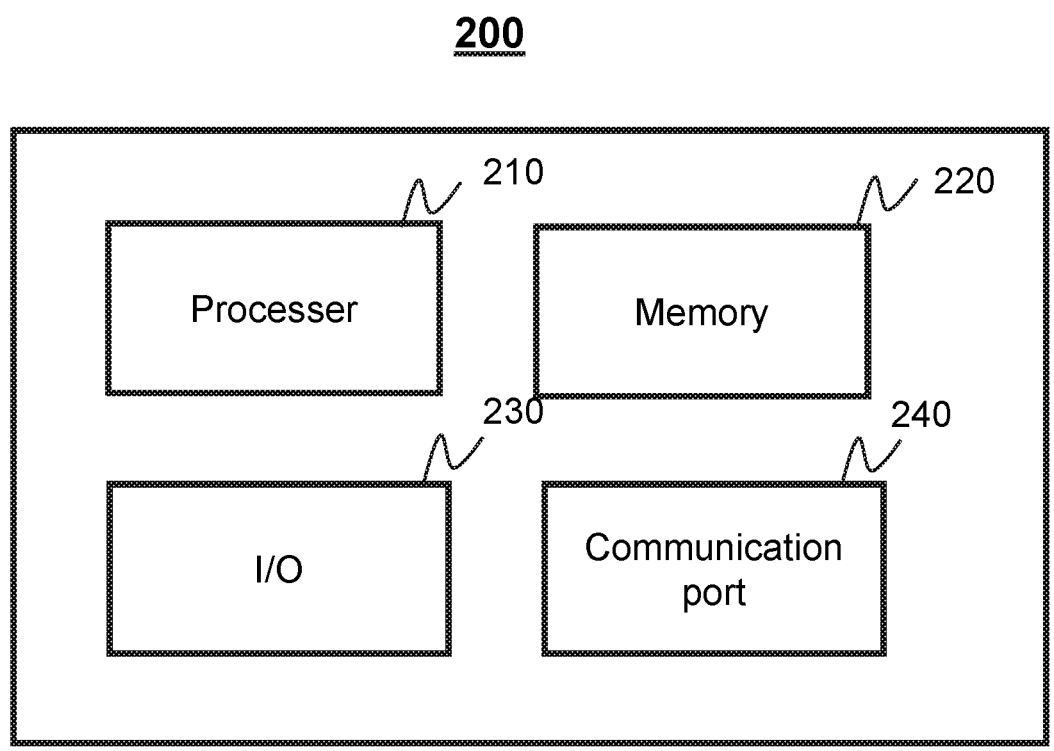
FIG. 2 is a schematic diagram illustrating exemplary hardware and/or software components of computing device on which the server and/or a user terminal may be implemented according to some embodiments of the present disclosure.

FIG. 2 is a schematic diagram illustrating exemplary hardware and/or software components of computing device 200 on which the server 110 and/or the user terminal 130 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of server 110 as describe in connection with FIG. 1. The computer instructions may include, for example, routines, programs, objects, components, data structures, procedures, modules, and functions, which perform particular functions described herein. For example, the processor 210 may process data obtained from the cameras 120, client terminal 130, and/or any other component of the monitoring system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from other components of server 110, cameras 120, client terminal 130, and/or any other component of the monitoring system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the server 110 for constructing a topology and tracking a target object.

The I/O 230 may input and/or output signals, data, information, etc. In some embodiments, the I/O 230 may enable a user interaction with the server 110. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 140) to facilitate data communications. The communication port 240 may establish connections between the server 110 and the cameras 120, and/or the client terminal 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
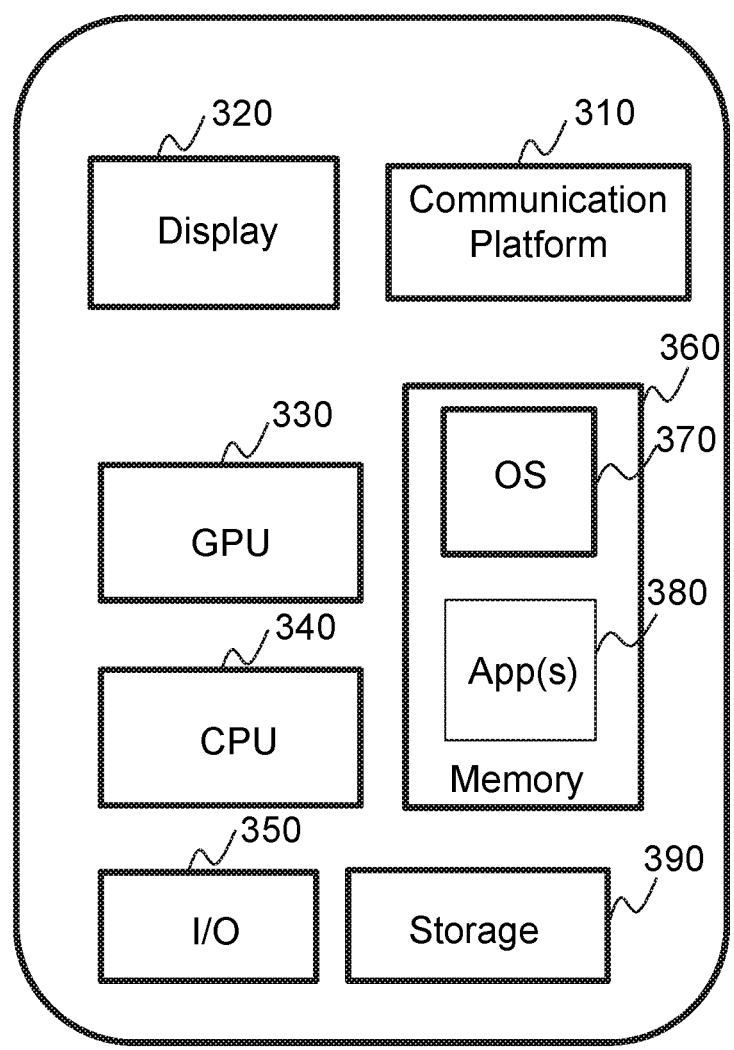
FIG. 3 is a schematic diagram illustrating exemplary hardware and/or software components of an example of a computing device on which a client terminal and/or a server may be implemented according to some embodiments of the present disclosure.

FIG. 3 is a schematic diagram illustrating exemplary hardware and/or software components of an example 300 of a computing device on which the client terminal 130 and/or the server 110 may be implemented according to some embodiments of the present disclosure. As illustrated in FIG. 3, the computing device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the device 300. In some embodiments, a mobile operating system 370 (e.g., iOS™, Android™, Windows Phone™, windows, etc.) and one or more applications 380 may be loaded into the memory 360 from the storage 390 in order to be executed by the CPU 340. The applications 380 may include a browser or any other suitable mobile apps for receiving and rendering information relating to image processing. User interactions with the information stream may be achieved via the I/O 350 and provided to the server 110 and/or other components of the monitoring system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
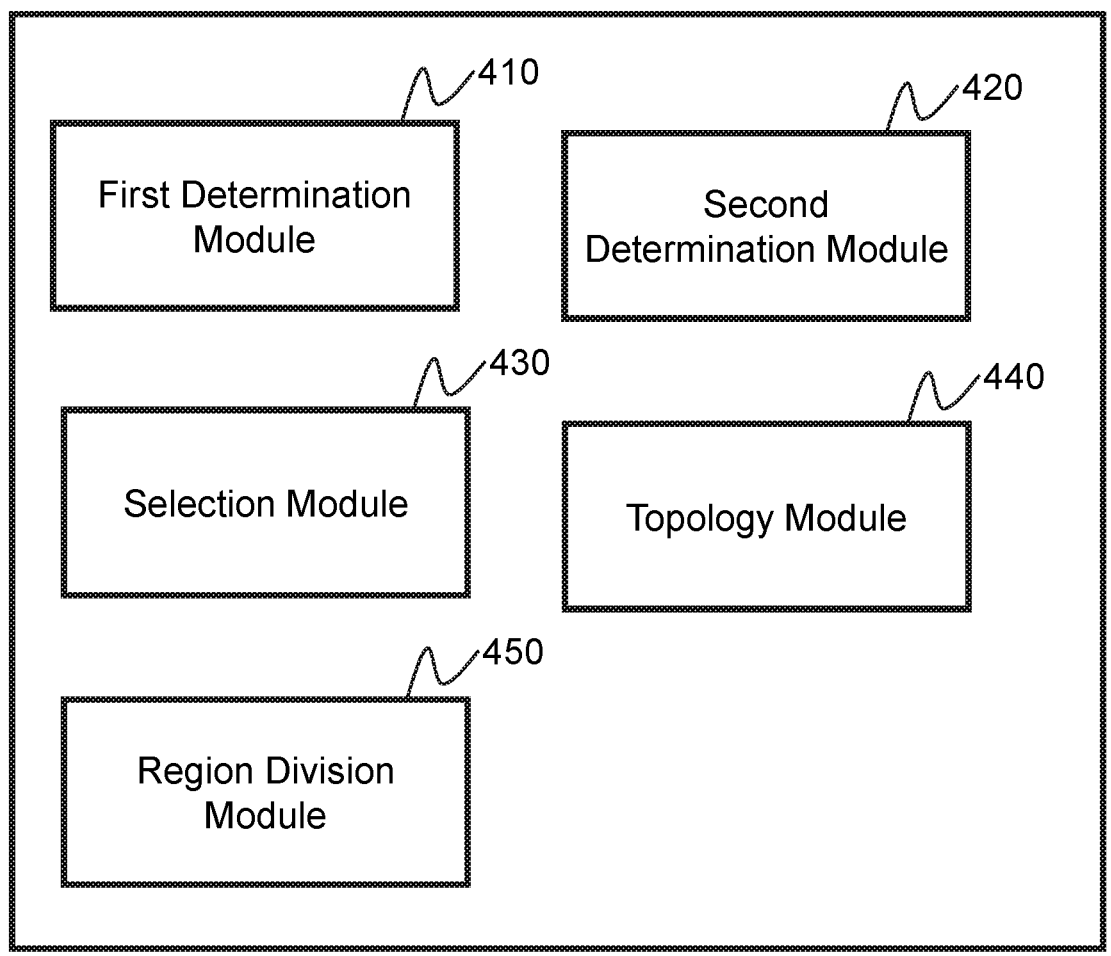
FIG. 4 is a schematic diagram illustrating an exemplary topology engine according to some embodiments of the present disclosure.

FIG. 4 is a schematic diagram illustrating an exemplary topology engine 105 according to some embodiments of the present disclosure. As shown, the topology engine 105 may include a first determination module 410, a second determination module 420, a selection module 430, a topology module 440, a region division module 450 and/or any other suitable component for generating topological data for one or more cameras. in some embodiments, the topology engine 105 can reside in a server (e.g., server(s) 110 of FIG. 1), a camera (e.g., camera(s) 120 of FIG. 1), a client terminal (e.g., client terminal(s) 130 of FIG. 1), and/or any other suitable device.

The first determination module 410 may be configured to identify one or more cameras that have detected a target object. The first determination module 410 may receive information from feature processing engine 106 and determine that the target object is detected by one or more cameras 120 based on the information. For example, the information may include a color and/or a license plate number of a vehicle. The first determination module 410 may scan images and/or videos captured by the cameras 120 for search the vehicle based on the color and/or the license plate number. In some embodiments, the first determination module 410 may determine one or more cameras that detect the vehicle as the first camera(s).

The second determination module 420 may determine whether one or more neighboring cameras of the first camera have detected the target object. In some embodiments, the neighboring cameras may be directly connected to the first camera. In some embodiments, the neighboring cameras may communicate with the first camera via one or more intermediate devices (e.g., a threshold number of intermediate devices, wherein the threshold number may be an integer greater than or equal to 1). In some embodiments, the intermediate devices may be any device that can facilitate communications among cameras 120, server 110, and client terminal 130. For example, each of the intermediate devices may be and/or include a router, a camera, and/or any other device that is capable of facilitate communications between two or more devices. In some embodiments, each of the intermediate devices may amplify and retransmit signals from any components of monitoring system 100. As another example, the intermediate devices may amplify instructions and transmit the instructions from server 110 to cameras 120. In some embodiments, each intermediate device may communicate with one or more other intermediate devices.

The selection module 430 may be configured to select, from the neighboring camera(s), a second camera as a next node of the first camera. In some embodiments, the selection module 430 may acquire time instants that the target object enters the FOVs of the neighboring cameras and then determine the neighboring camera corresponding to a particular time instant (e.g., the earliest time instant) as the next node of the first camera.

In some embodiments, the selection module 430 can determine that the target object enters multiple neighboring cameras (also referred to as the "candidate neighboring cameras") simultaneously and/or substantially simultaneously upon leaving the FOV of the first camera. the selection module 430 may select, from the candidate neighboring cameras, one or more cameras as the next node of the first camera. For example, the selection module 430 can determine time instants corresponding to leaving of the FOVs of the candidate neighboring cameras by the target object. The selection module 430 can then select a candidate neighboring camera corresponding to a particular time instant (e.g., the latest time instant) as the next node of the first camera.

As another example, the selection module 430 can analyze image data provided by the candidate neighboring camera and determine one or more portions of the image data corresponding to the target object (e.g., one or more regions of one or more images including the target object). The selection module 430 can further determine, for each of the candidate neighboring cameras, an amount of image data that corresponds to the target object. The amount of image data may be represented using, for example, the number of pixels, the size of an image region, a proportion, etc. The selection module 430 can select, form the candidate neighboring cameras, a candidate neighboring camera corresponding to a particular amount of image data corresponding to the target object (e.g., the greatest amount, the second greatest amount, etc.) as the next node of the next camera.

As still another example, the selection module 430 may determine one or more first feature(s) of the target object based on image data provided by the first camera and one or more second features of the target object based on image data provided by each of the candidate neighboring cameras. The selection module 430 can also compare the first feature(s) and the second feature(s) to determine similarities between the first feature(s) and the second feature(s). In some embodiments, the selection module 430 can identify particular second feature(s) (e.g., the second feature(s) with the greatest similarity) based on the comparison. The selection module 430 can select, from the candidate neighboring cameras, a candidate neighbor camera corresponding to the particular second feature(s) as the next node of the first camera.

Figure 8A:
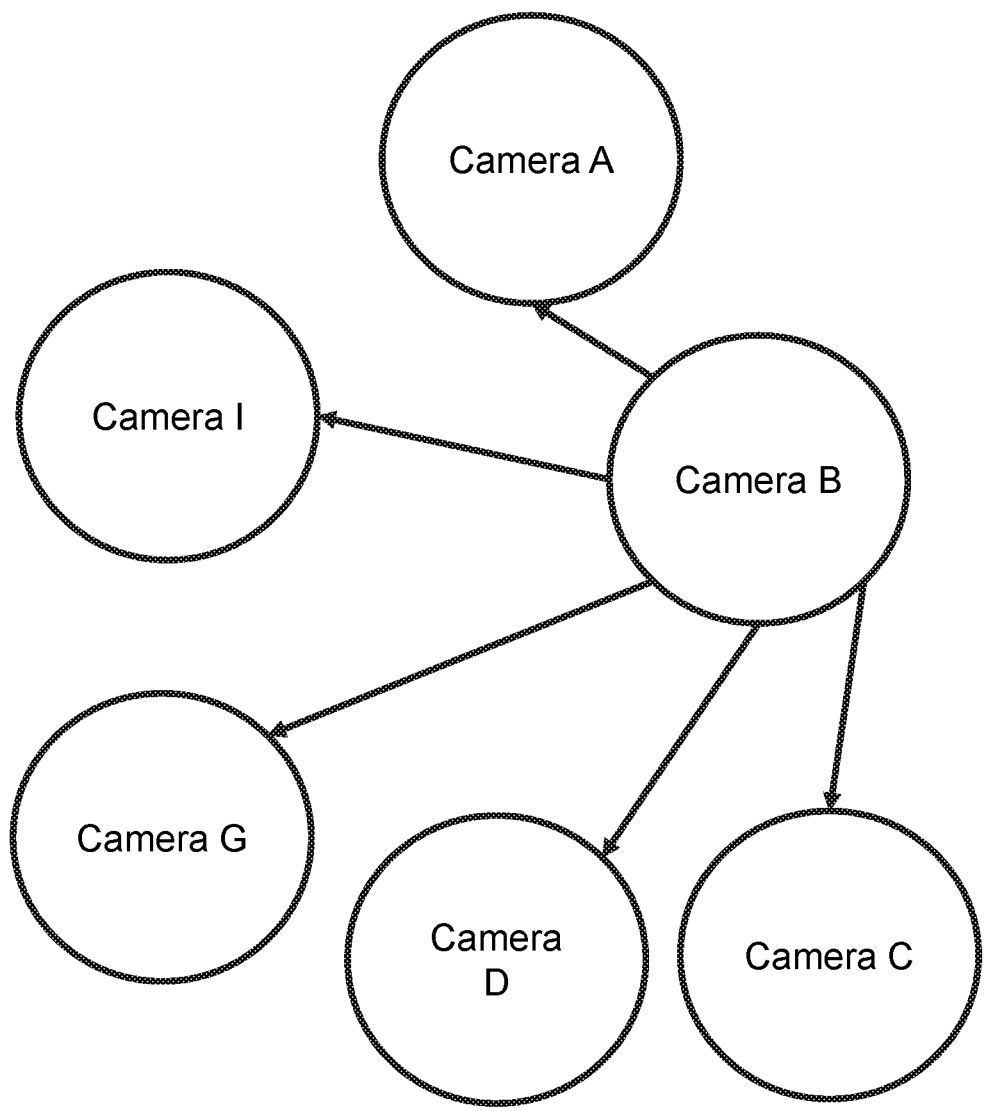
FIGS. 8A-8B show examples of topology structures of a camera system according to some embodiments of the present disclose.
Figure 8B:
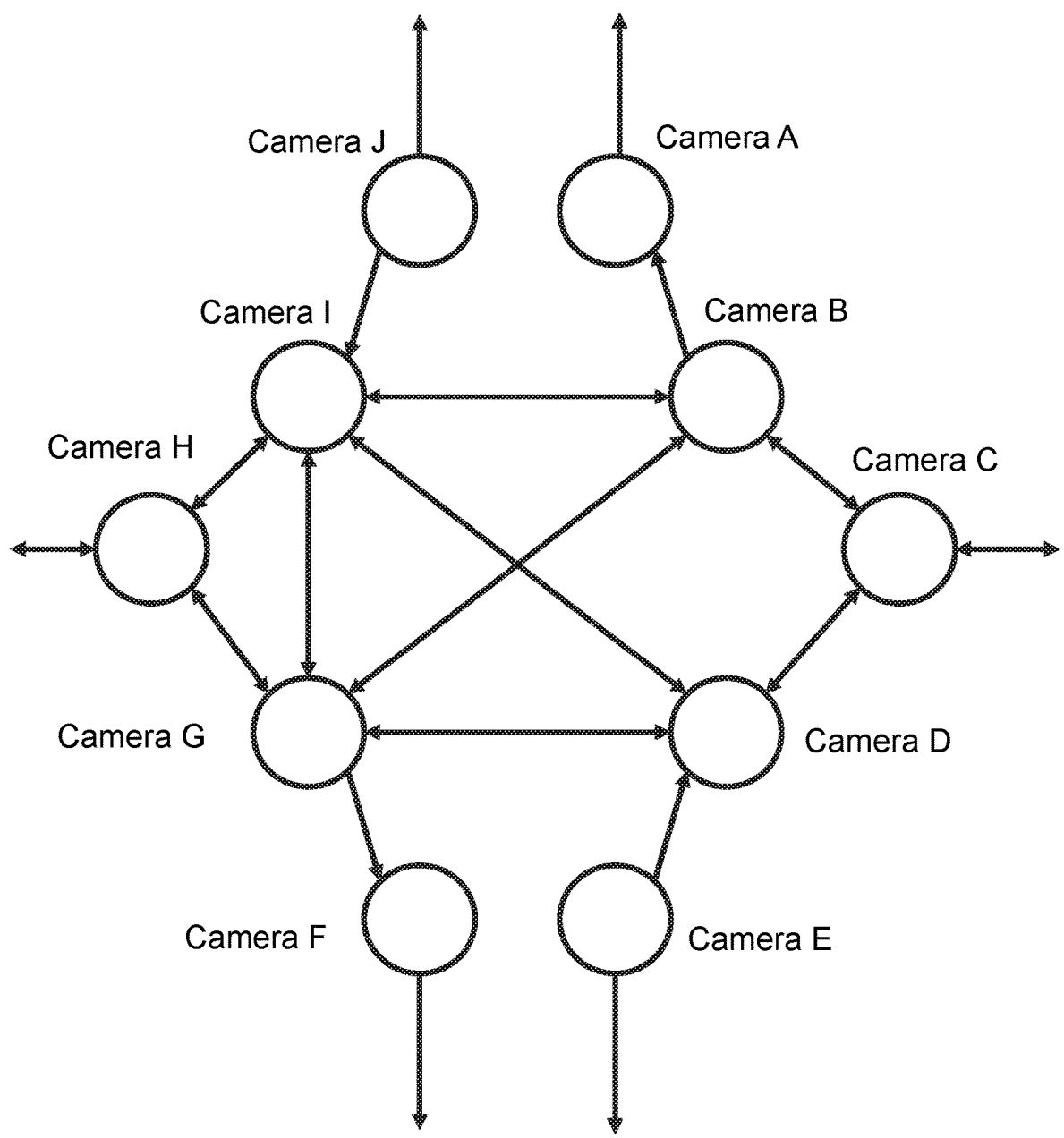

The topology module 440 may be configured to construct topology structures for the first camera and the next node. In some embodiments, the topology module 440 may determine a motion direction of the target object and identifying information of the next node (e.g., an identification). The topology module 440 can then construct the topology structure between the first camera and the node based on the motion direction of the target object. In some embodiments, the motion direction of the target object can be determined by determining motion information of the target object when the target object leaves the FOV of the first camera and/or enters the FOV of the next node. In some embodiments, the topology module 440 may construct a global topology structure (e.g., topological data as illustrated in FIG. 8B) that may include all cameras in the monitoring system 100 by performing operations described above iteratively.

Region division module 450 may be configured to divide an FOV and/or one or more portions of the FOV (e.g., edges of the FOV) of a camera into multiple regions. In some embodiments, the multiple regions may correspond to different motion directions of the target object.

It should be noted that the above description of topology engine 105 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the first determination module 410 and the second determination module 420 may be integrated into on module for determining the first camera and neighboring cameras. As another example, any one of the modules may be divided into two or more sub-modules.

Figure 5:
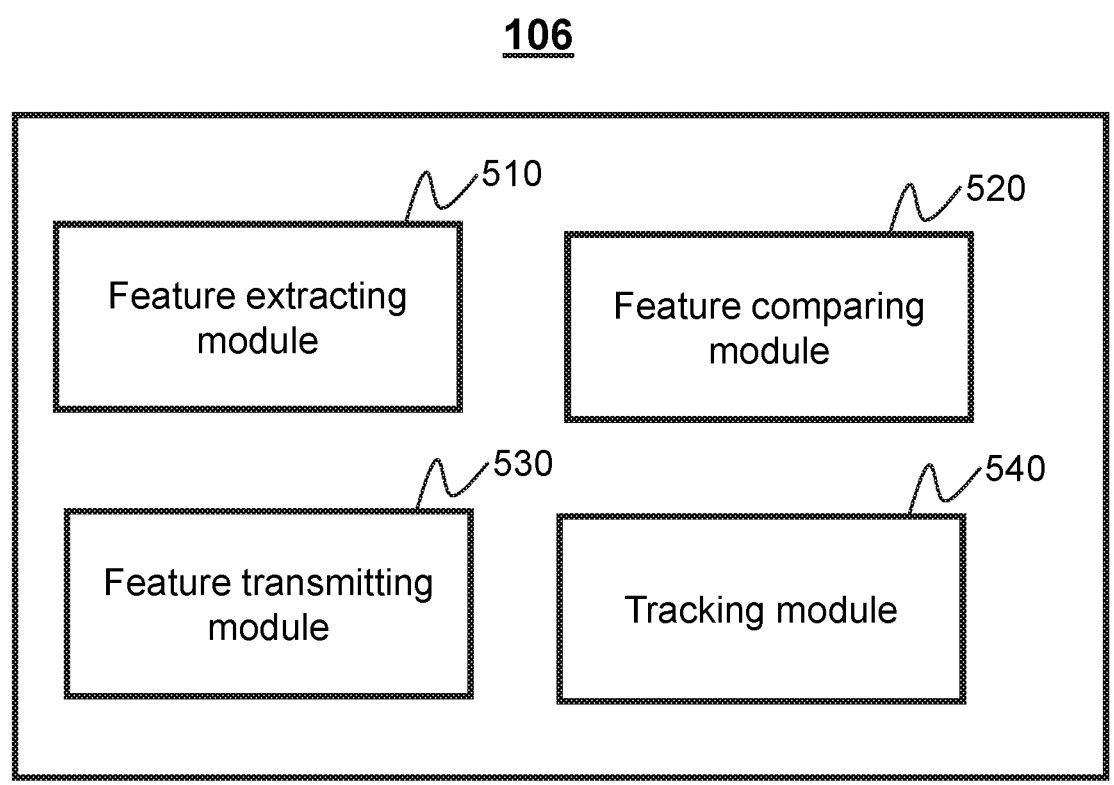
FIG. 5 is a schematic diagram illustrating an exemplary feature processing engine according to some embodiments of the present disclosure.

FIG. 5 is a schematic diagram illustrating an exemplary feature processing engine 106 according to some embodiments of the present disclosure. The feature processing engine 106 may include feature extracting module 510, feature comparing module 520, feature transmitting module 530, tracking module 540, and/or any other suitable components for object tracking and/or monitoring.

The feature extracting module 510 may be configured to extract features of the target object. In some embodiments, features may be different categories according to different target object. For example, the features may be color, license plate, size, motion direction location, speed for a moving vehicle. As another example, the features may be facial feature (e.g., eyes, ears, nose and/or mouse) and physical characteristics (e.g., height, body figures, walking gesture and/or hair styles) for a person.

The feature comparing module 520 may be configured to compare the features of the target object with images and/or videos captured by cameras. In some embodiments, the feature comparing module 520 can detect each images captured by cameras continuously and determine whether the cameras capture the target object based on the comparison. In some embodiments, the feature comparing module 520 may detect each frame of images captured by cameras continuously. In some embodiments, the feature comparing module 520 may detect the images in a predetermined time interval. The predetermined time interval may be set according to different monitoring systems and/or target objects. For example, the predetermined time interval may be adjusted based on the speed of the target object. For example, a greater time interval may be used for a higher speed while a less time interval may be used for a lower speed.

The feature transmitting module 530 may be configured to transmit the features of the target object to cameras 120, client terminal 130 and/or any other components of the monitoring system 100. In some embodiments, the feature transmitting module 530 may aggregate the features to a frame or a package for transmitting. For example, the frame or package may be aggregated based on the communication protocol (e.g., NFC protocol, BAN, PAN, NAN, MAN, WAN, IAN).

The tracking module 540 may be configured to track the target object. In some embodiments, the tracking module 540 may receive request signals for tracking an object. In some embodiments, the request signal may include a command for tracking the target object and/or features of the target object. For example, cameras may generate the request signal and transmit it to the tracking module 540 for tracking the target object. In some embodiments, the tracking module 540 may be configured to transmit a response signal to the server 110, the cameras 120 and/or the client terminals. The response signal may include information about whether or not cameras have tracked the target object. Furthermore, the response signal may also include information about the target object, for example, timestamp that the target object accesses and/or leaves FOV of cameras.

It should be noted that the above description of the feature processing engine is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more units in the feature processing engine 106 may include an independent storage block (not shown) respectively. As another example, any two or more units may be combined as an independent module used to implement more than one functions. As a further example, anyone of the modules may be divided into two or more sub-modules.

Figure 6:
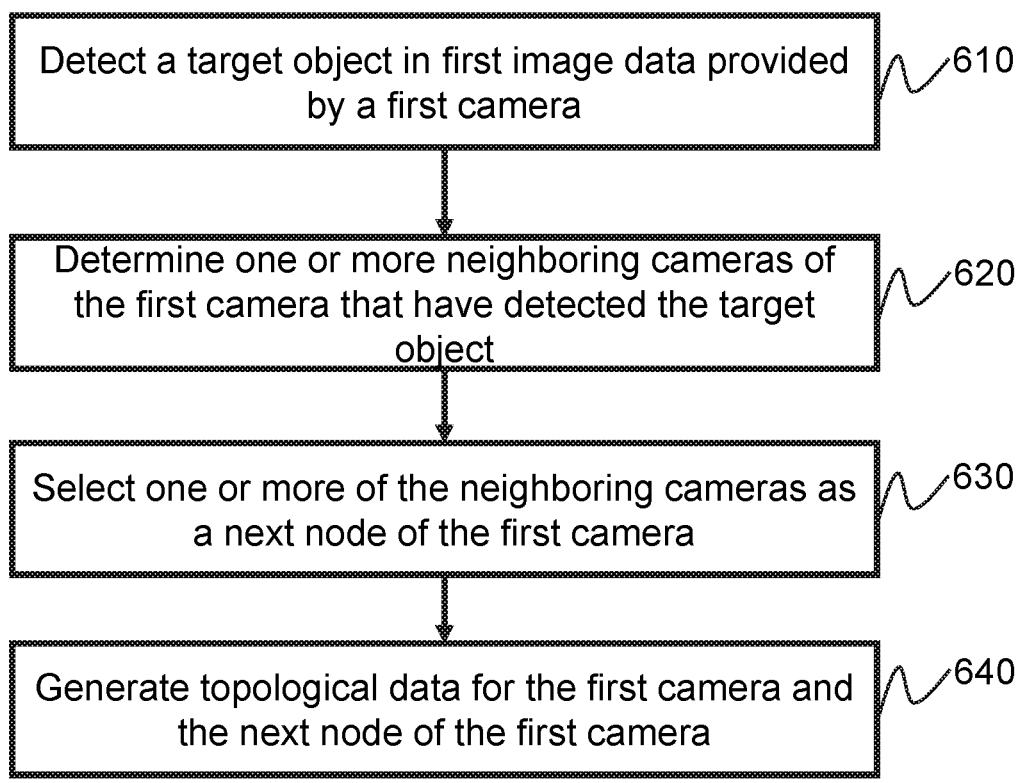
FIG. 6 is a flow chart illustrating an exemplary process for generating topological data for a camera network according to some embodiments of the present disclosure.

FIG. 6 is a flow chart illustrating an exemplary process 600 for generating topological data for a camera network according to some embodiments of the present disclosure. In some embodiments, process 600 can be implemented by one or more of server(s) 110, cameras 120, and/or user terminal(s) 130.

In 610, process 600 can detect a target object in first image data provided by a first camera. The processor can also identify the first camera (e.g., by determining identifying information of the first camera). In some embodiments, the target object may be identified based on one or more user inputs, such as a user selection of one or more portions of the first image data relating to the target object. For example, a user can select one or more images and/or portions of an image showing the target object. Process 600 can process the image data selected by the user and extract one or more features of the target object.

In some embodiments, process 600 can process the first image data and detect the target object using one or more image processing and/or object detection techniques. Process 600 can then extract one or more features of the target object. In some embodiments, the image processing and/or feature extraction may be performed multiple times to obtain more accurate features. For example, extraction of features of the target object may be performed several times for avoiding low recognition rate when the target object is a person or an animal.

In some embodiments, process 600 can process image data provided by multiple cameras and detect one or more object in the image data. Process 600 can then select a detected object (e.g., a random object) as the target object and/or a camera that has detected the target object as the first camera.

In some embodiments, process 600 can identify a camera that provides image data relating to the target object as the first camera. The camera can be a random camera, a camera selected by a user, etc. In some embodiments, process 600 can identify the first camera by determining an identification (ID) of the first camera. The ID can include any information that can be used to identify the first, such as an index number of the first camera, a physical address of the first camera, a network address of the first camera, or the like, or any combination thereof.

In 620, process 600 can determine one or more neighboring cameras of the first camera that have detected the target object. In some embodiments, a neighboring camera of the first camera may be a camera that is communicatively coupled to the first camera. For example, the neighboring camera and the first camera can communicate with each other via a direct connection. The direct connection may be and/or include a wired connection or a wireless connection (e.g., a Wi-Fi connection) between the neighboring camera and the first camera. As another example, the neighboring camera and the first camera can communicate with each other via a threshold number (e.g., zero, one, two, etc.) of intermediate devices. In some embodiments, the threshold number may be adjusted based on the number of cameras that can be used to construct the topology. For example, a greater threshold number may be assigned to a system of a greater number of cameras while a less threshold number may be assigned to a system of a fewer number of cameras.

In some embodiments, process 600 can determine a neighboring camera as having detected the target object in response to detecting the target object in image data provided by the neighboring camera (also referred to as the "second image data"). For example, the processor can analyze the first image data to determine one or more features of the target object. The processor can then analyze the second image data to determine whether one or more features of an object detected in the second image data match the features of the target object. In some embodiments, the processor can analyze one or more portions of the second image data to identify the target object. For example, the processor can process and/or analyze particular images in the second image data, such as images captured in a predetermined time interval (e.g., every few seconds) and/or at a particular rate (e.g., every other frame). The predetermined time interval may be set according to features of the target object and/or processing capabilities of the monitoring systems. For example, a shorter time interval and/or a higher rate may be used for a target object that has a higher speed while a longer time interval and/or a lower rate may be used for a target object that has a lower speed.

In some embodiments, process 600 can transmit a request for tracking the target object to one or more neighboring cameras. The neighboring camera(s) may analyze the second image data and/or detect the target object based on the second image data. The neighboring camera(s) can also generate a response based on the analysis and/or detection. The response may include information indicative of detection of the target object, information indicating that the target object is not detected in the second image data, identifying information of the neighboring cameras (e.g., an identification), timing information relating to an entry and/or exit of the field of view of the first camera by the target object (e.g., a time instant corresponding to an entry of the FOV of the first camera by the target object, a time instant corresponding to departure from the FOV of the first camera by the target object), timing information related to an entry and/or exit of the FOVs of the neighboring camera(s) by the target object, etc.

In 630, process 600 may select one or more of the neighboring cameras as a next node of the first camera. For example, the processor can select each of the neighboring cameras as a next node of the first camera. As another example, the processor may determine that the target object enters the FOV of a particular neighboring camera after leaving the FOV of the first camera. Process 600 can then identify the particular neighboring camera as the next node of the first camera. As still another example, process 600 may sort the neighboring cameras based on time instants corresponding to entries of the FOVs of the neighboring cameras by the target object. The processor can identify a neighboring camera associated with the earliest time instant as a next node of the first camera. In some embodiments, the processor may determine multiple neighboring cameras as the nodes of the first camera when the target object accesses the FOVs of the neighboring cameras simultaneously and/or substantially simultaneously.

In some embodiments, process 600 can determine the next node(s) of the first camera based on motion information of the target object. For example, process 600 can determine a motion direction of the target object (e.g., a direction in which the target object leaves the FOV of the first camera). Process 600 can then identify a neighboring camera as a next node based on the motion direction (e.g., by determining that the target object may enter the FOV of the neighboring camera when moving in the motion direction). The next node may be determined by performing one or more operations described in connection with FIGS. 7-12 below.

In some embodiments, the server 110 may determine the neighboring cameras as the next node based on different conditions, for example, proportion of the target object in the FOV of the neighboring cameras, similarity of the target object in the FOV of the first camera and the neighboring cameras, time that the target object leave the FOV of the neighboring cameras. For example, the server 110 may determine the neighboring cameras with largest proportion of the target object or largest similarity of the target object as the next-hop cameras. In some embodiments, the server 110 may determine the motion direction of the target object based on features of the target object.

In 640, process 600 can generate topological data for the first camera and the next node of the first camera. The topological data may include any information about topological relations between the first camera and the next node(s), such as identifying information of the first camera, identifying information of the next node(s), one or more motion directions associated with the next node(s), one or more regions of the FOV of the first camera that correspond to the next node(s), etc. For example, the topological data can include one or more data items described in connection with Tables 1-3 and FIGS. 7-10.

In some embodiments, process 600 can be executed in an iterative manner to generate topological data for a camera network of multiple cameras. For example, topological data of each of the cameras in the camera network can be generated by performing one or more operations described in connection with 610-640. Multiple cameras can be processed in parallel, sequentially, in a random order, and/or in any other manner to generate topological data.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the first camera may be configured to select the neighboring cameras as the next-hop cameras and construct the topology structure. As another example, in an iteration, obtaining a target object in 610 may be unnecessary.

Figure 7:
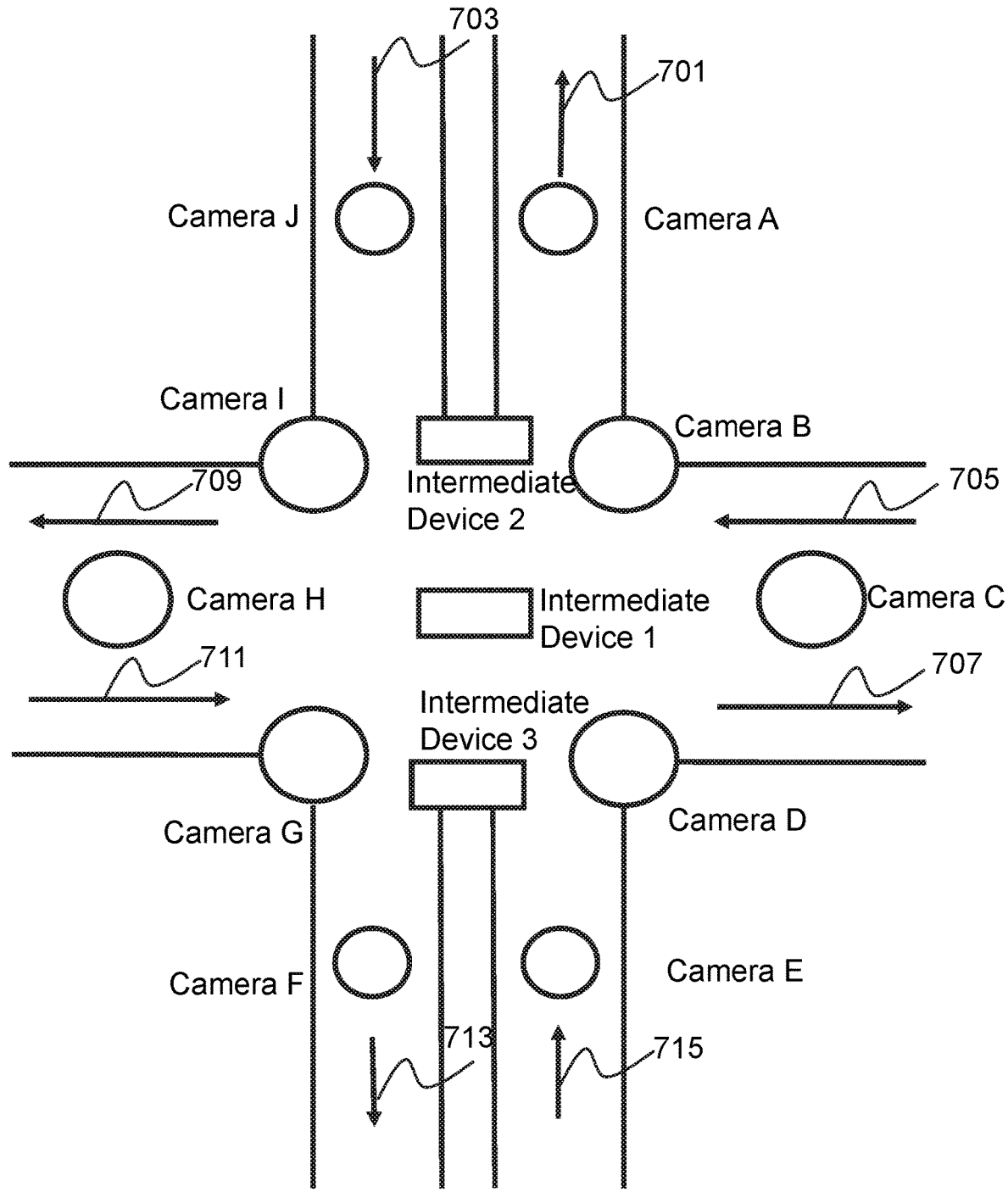
FIG. 7 is a diagram illustrating a camera network according to some embodiments of the present disclose.

FIG. 7 is a diagram illustrating a camera network 700 according to some embodiments of the present disclose. In some embodiments, camera network 700 can be implemented in a surveillance system to monitor traffic of a location (e.g., a crossroad). The location may have unidirectional traffic and/or bidirectional traffic. Each of arrows 701, 703, 705, 707, 707, 709, 711, 713, and 715 may represent a direction in which traffic can move.

As shown in FIG. 7, the camera network can include cameras A-J and intermediate devices 1-3. In some embodiments, cameras A and J may be connected via intermediate device 2. Cameras B, C, D, G, H, and I may be connected via intermediate device 1. Cameras E and F may be connected via intermediate device 3. A camera and its neighboring camera can be connected via a particular number of intermediate devices (e.g., a number that is not greater than a threshold). In some embodiments, each of cameras A, C, D, E, F, G, H, and J may be regarded as being a neighboring camera of camera B.

In some embodiments, camera B may send a request for object tracking to one or more other cameras as shown in FIG. 4. The request for object tracking may include a request for tracking a target object, such as an object that is in the FOV of camera B, an object that is leaving the FOV of camera B, an object that is detected based on image data acquired by camera B, etc. Camera B can send the request for object tracking to one or more of its neighboring cameras. For example, camera B can send the request for object tracking to all of its neighboring cameras.

As another example, camera B can select one or more neighboring cameras based on motion information related to the target object and can send the request for object tracking to the selected neighboring camera(s). More particularly, for example, camera B can determine a motion direction of the target object when the target object leaves the FOV of camera B. Camera B can then identify one or more neighboring cameras based on the motion direction. The motion direction may be a direction relative to camera B (e.g., a left direction, a right direction, an upward direction, a downward direction, a diagonal direction, etc.), a direction relating to a motion vector of the target object, etc. In some embodiments, in response to determining that the target object moves to the left of camera B when leaving the FOV of the camera B, camera B may determine that the target object may enter the FOVs of cameras A, I, and/or G. Camera B and/or the server 110 may send the request for object tracking to cameras A, I, and/or G. In some embodiments, in response to determining that the target object moves to the right of camera B when leaving the FOV of the camera B, camera B may determine that the target object may enter the FOV of camera c. Camera B and/or the server 110 may send the request for object tracking to camera C. As such, the request for object tracking does not have to be sent to all of the neighboring cameras of camera B. The performance of the camera network 700 may be enhanced by reducing the load of the cameras and the utilization of the computing resources in the camera network 700.

In some embodiments, camera I may be determined as the next node of the camera B when the target object is moving from right to left. Camera I may detect the target object and then send a response signal to camera B. The topological data related to camera B may include mapping information that can be used to map a motion direction of the target object to a next node camera associated with the motion direction. For example, the topological data related to camera B can include a topology structure of cameras as illustrated in table 1 and FIG. 8A.

TABLE 1

| ID of the First Camera | Motion direction | ID of the Next Node |
|---|---|---|
| B | Upper Left | A |
| B | left | I |
| B | Lower Left | G |

TABLE 1-continued

| ID of the First Camera | Motion direction | ID of the Next Node |
|---|---|---|
| B | down | D |
| B | Lower Right | C |

The cameras 120 and/or the server 110 may determine topological data for the camera network 700 and/or the cameras in the camera network 700 by performing operations as described above iteratively. For example, a topology structure as illustrated in FIG. 8B (e.g., a global topology structure) may be determined for the camera network 700. The topology structure may indicate relationships between cameras A-J and motion directions of a target object (e.g., mapping information that can be used to map a motion direction of the target object to a next node camera associated with the motion direction). For example, the topological data related to the camera network 700 can include a topology structure of cameras as illustrated in Table 2.

TABLE 2

| ID of the First Camera | Motion direction | ID of the Next Node |
|---|---|---|
| B | Upper Left | A |
| B | Left | I |
| B | Lower Left | G |
| B | Low | D |
| B | Lower Right | C |
| C | Upper Left | B |
| C | Lower Left | D |
| D | Up | B |
| D | Upper Left | I |
| D | Left | G |
| D | Lower Left | E |
| D | Upper Right | C |
| E | Upper Right | D |
| G | Upper | I |
| G | Upper Left | H |
| G | Lower Right | F |
| G | Right | D |
| G | Upper Right | B |
| H | Upper Right | I |
| H | Lower Right | G |
| I | Lower Left | H |
| I | Low | G |
| I | Lower Right | F |
| I | Right | D |
| I | Upper Left | B |
| J | Lower Left | I |

In some embodiments, the FOV of a given camera may be divided into a certain number of regions (e.g., M regions, where M is an integer equal to or greater than 1). In some embodiments, the number of regions may be determined based on the size of the FOV of the camera. The FOVs of different sizes can be divided into different number of regions. For example, an FOV of 20 square meters may be divided into 6 regions and an FOV of 30 square meters may be divided into 20 regions. In some embodiments, the number of regions can be determined based on one or more user inputs.

In some embodiments, the regions of the FOV may be associated with various motion directions. Camera B and/or server 110 can determine a motion direction of a target object by detecting the target object in one or more of the regions. For example, camera B and/or server 110 can determine that the target object enters a particular region of the FOV when the target object leaves the FOV. Camera B and/or server 100 can then determine that the motion direction of the target object is a direction associated with the particular region.

Figure 9:
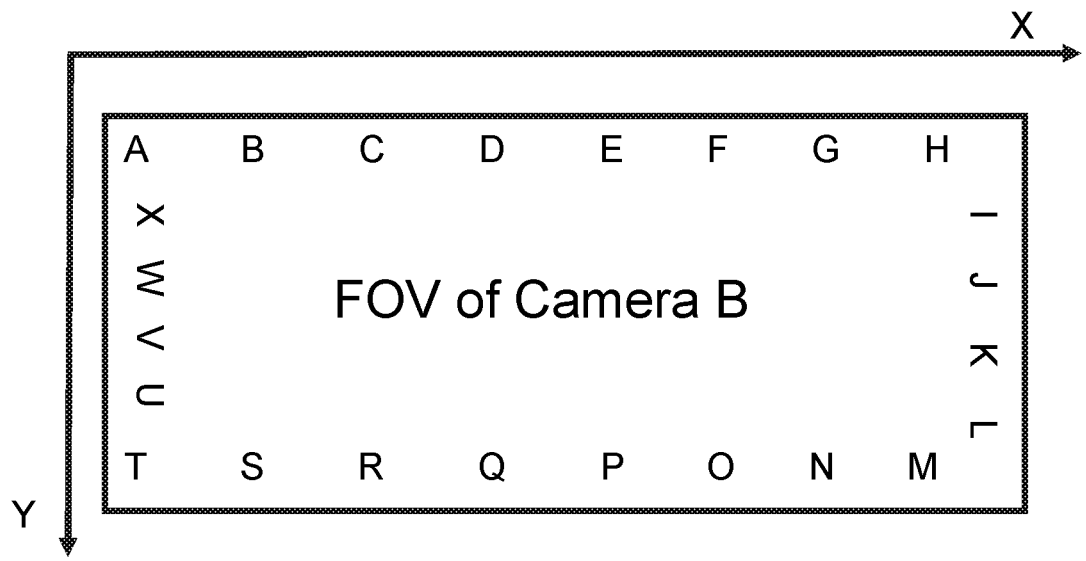
FIG. 9 shows exemplary regions of a field of view of a cameras according to some embodiments of the present disclosure.

For example, as illustrated in FIG. 9, the FOV of camera B can be divided into multiple regions based on a coordinate system. The regions may correspond to the edges of the FOV and may correspond to different directions. More particularly, for example, the regions may include regions A-H and M-T along a first axis of the coordinate system (e.g., the X axis as illustrated in FIG. 9) and regions I-L and U-X along a second axis of the coordinate system (e.g., the Y axis). In some embodiments, the camera B may determine the motion direction of the target object based on coordinate information of the regions. For example, camera B and/or server 110 can determine that the target object is detected in region W when it leaves the FOV of camera B. Camera B and/or server 110 can then determine that the motion direction of the target object is a left direction. As another example, camera B and/or server 110 may determine that the motion direction of the target object is a right direction in response to determining that the target object enters region J when it leaves the FOV of camera B.

In some embodiments, the server 110 and/or cameras 120 may divide the edges of the FOV of a camera into a first number of regions (M regions) in a first direction (e.g., an upper horizontal direction) and a second direction (e.g., a lower horizontal direction). The edges of the FOV of the camera can be divided into a second number of regions (N regions) in a third direction (e.g., a left vertical direction) and a fourth direction (e.g., a right vertical direction). The first number and the second number may or may not be the same. In some embodiments, each of M and N is an integer equal to or greater than 1. The coordinates of the $i^{th}$ region in the first direction may be represented as $$\left\{ (x, y) \,\middle|\, x \in \left[\frac{X}{M}(i-1), \frac{X}{M}i\right], y \in \left[0, \frac{Y}{N}\right] \right\}.$$

The coordinates of the $i^{th}$ region in the second direction may be represented as $$\left\{ (x, y) \,\middle|\, x \in \left[\frac{X}{M}(i-1), \frac{X}{M}i\right], y \in \left[\frac{Y}{N}(N-1), Y\right] \right\}.$$

The coordinates of the $j^{th}$ region in the third direction may be represented as $$\left\{ (x, y) \,\middle|\, x \in \left[0, \frac{X}{M}\right], y \in \left[\frac{Y}{N}(j-1), \frac{Y}{N}j\right] \right\}.$$

The coordinates of the $j^{th}$ region in the fourth direction may be represented as $$\left\{ (x, y) \,\middle|\, x \in \left[\frac{X}{M}(M-1), X\right], y \in \left[\frac{Y}{N}(j-1), \frac{Y}{N}j\right] \right\}.$$

Referring back to FIG. 7, the FOV of camera B can be divided into eight regions in the first direction and the second direction. The FOV of camera B can be divided into six regions in the third direction and the fourth direction.

Figure 10:
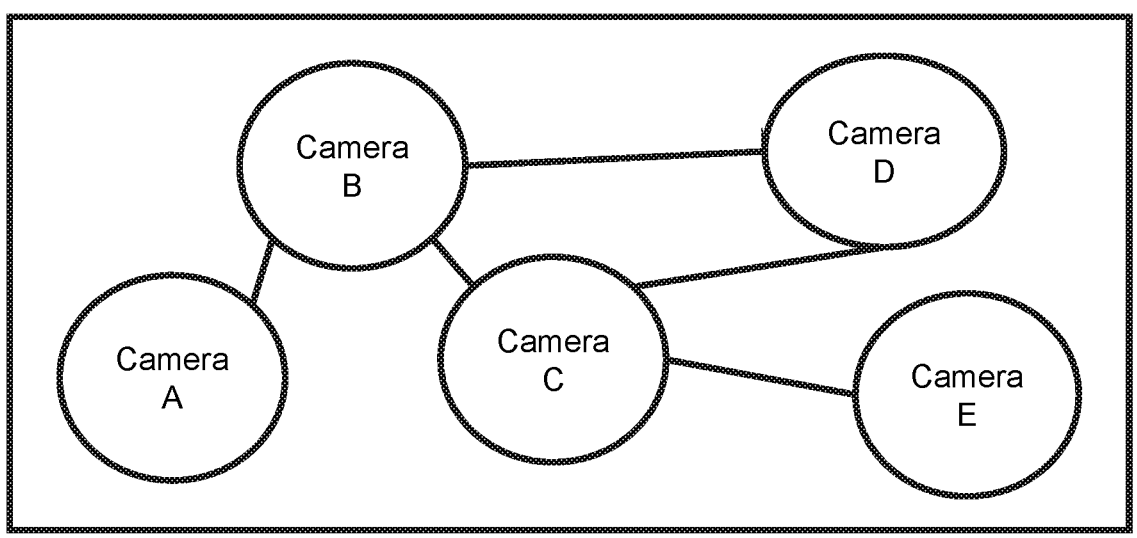
FIG. 10 shows another example of a topology structure of a camera system according to some embodiments of the present disclosure.

As illustrated in FIG. 10, when the target object leaves the FOV of camera B, the target object can enter the FOVs of cameras A, C, and/or D. Camera B and/or server 110 can then determine cameras A, C, and/or D as the next node of camera B.

In some embodiment, the topological data of a camera can include information about one or more next nodes of the camera and one or more regions of the FOV of the camera corresponding to the next node(s). For example, as illustrated in Table 3, the topological data of camera B can include information of the next node of camera B (e.g., identifying information of camera A, C, and/or D). The topological data of camera B can also include information of one or more regions corresponding to each of the next nodes (e.g., identifying information of a region, coordinates of the region, etc.).

TABLE 3

| ID of the first camera | ID of Region | Coordinate(s) of Region | ID of the Next Node |
|---|---|---|---|
| B | S | $\left\{ (x, y) \,\middle|\, x \in \left[\frac{X}{8}, \frac{X}{4}\right], y \in \left[\frac{5Y}{6}, Y\right] \right\}$ | A |
| B | O | $\left\{ (x, y) \,\middle|\, x \in \left[\frac{5X}{8}, \frac{3X}{4}\right], y \in \left[\frac{5Y}{6}, Y\right] \right\}$ | C |
| B | J | $\left\{ (x, y) \,\middle|\, x \in \left[\frac{7X}{8}, X\right], y \in \left[\frac{Y}{3}, \frac{Y}{2}\right] \right\}$ | D |

As shown in Table 3, the target object may access the FOVs of cameras A, C and D when it crosses the region S, O, and J, respectively. The coordinates of region S may be represented as $$\left\{ (x, y) \,\middle|\, x \in \left[\frac{X}{8}, \frac{X}{4}\right], y \in \left[\frac{5Y}{6}, Y\right] \right\},$$

wherein M=8, N=6, and i=2. The target object can leave the FOV of camera B via region and enter the FOV of camera A via region S. The target object can leave the FOV of camera B via region J and enter the FOV of camera D.

Figure 11:
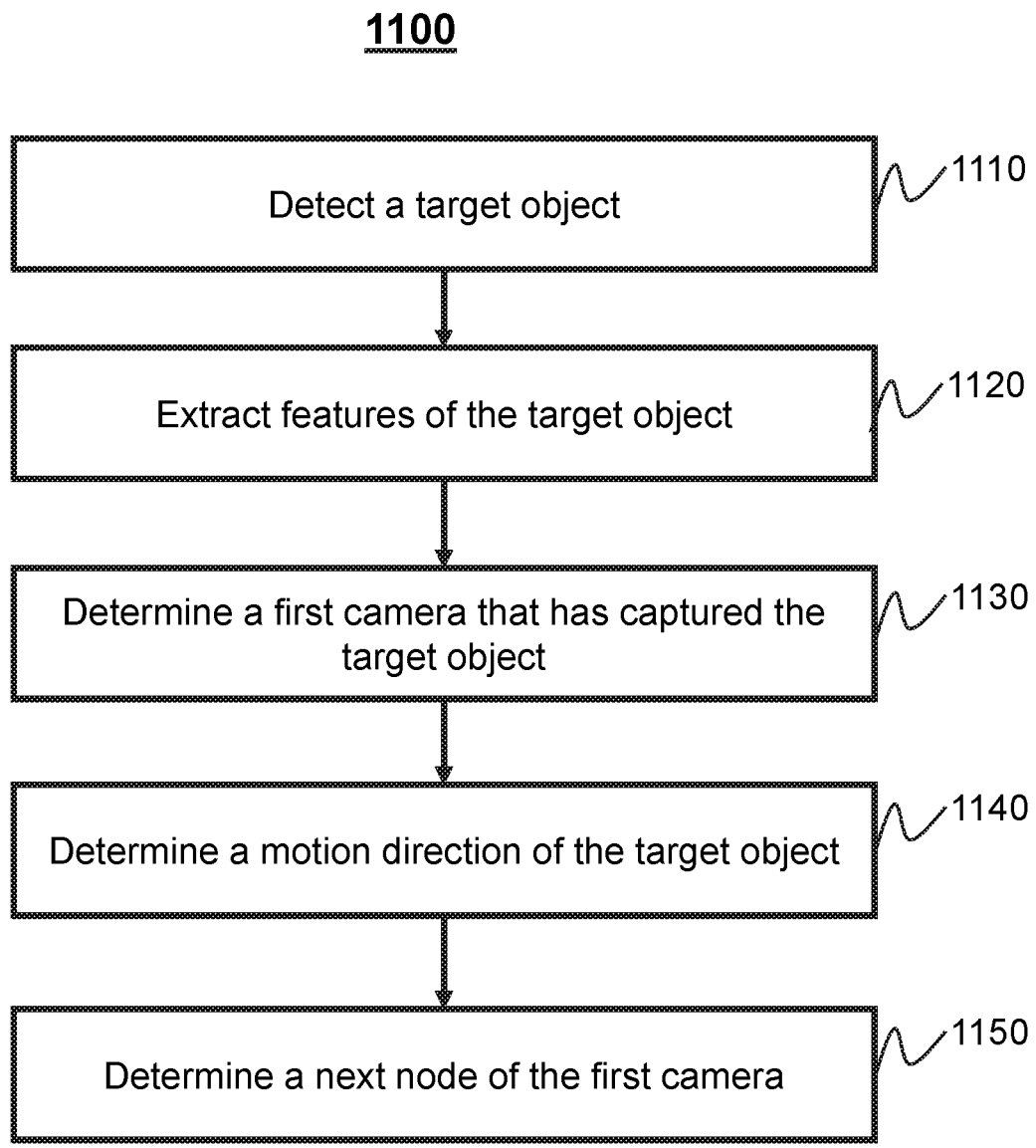
FIG. 11 is a flow chart illustrating an exemplary process for tracking a target object by a server according to some embodiments of the present disclosure.

FIG. 11 is a flow chart illustrating an exemplary process 1100 for tracking a target object by a server according to some embodiments of the present disclosure.

In 1110, the server (e.g., a server 110 of FIG. 1) may detect a target object. In some embodiments, the target object may be identified by a user via a client terminal (e.g., client terminal 130 of FIG. 1). In some embodiments, the target object may be detected by processing image data relating to the target object. The server may detect the target object based on multiple user selections of image data corresponding to the target object and/or extractions of features of the target object.

In 1120, the server 110 may extract one or more features of the target object. Each of the features may correspond to one or more portions of image data related to the target object (e.g., an image, one or more pixels, one or more image regions, etc.). In some embodiments, different features may be extracted for different target objects. For example, the features may be color, license plate number, size, motion direction, location, speed, etc. for a vehicle. As another example, the features may include one or more facial features and/or physical characteristics (e.g., height, body figures, walking gesture, and/or hair styles) of a person.

In 1130, the server may determine a first camera that has detected the target object. For example, the server can determine the first camera by determining that image data provided by the first camera relate to the target object. The server may also determine identifying information of the first camera (e.g., an identification).

In 1140, the server may determine a motion direction of the target object. In some embodiments, the server 110 may divide the FOV of the first camera and/or one or more portions of the first camera (e.g., edges of the first camera) into multiple regions. The multiple regions may correspond to different motion directions of the target object. In some embodiments, the server may determine the motion direction based on that the region from which the target object leaves the FOV of the first camera.

In 1150, the server may determine a next node of the first camera based on the motion direction and/or topological data related to the first camera. For example, the server may determine a neighboring camera of the first camera that corresponds to the motion direction based on the topological data. The server may then designate the neighboring camera as the next node of the first camera.

In some embodiments, the server can receive image data from the next node of the first camera. The server can also analyze image data provided by the next node of the first camera to determine whether the next node has detected the target object. The analysis may be performed using any suitable object detection, object tracking, and/or any other image processing techniques. As such, the server can identify a next camera (e.g., a camera that is different from the first camera) that is likely to detect the target object and control the next camera to perform object tracking. This can enable the server to utilize its processing resources efficiently.

In some embodiments, the server can perform process 1100 in an iterative manner. For example, the server can identify the next node of the first camera as the first camera and loop back to 1120 and/or 1130. The features of the target object may be updated in the iterations.

In some embodiments, the server may be configured to select, from one or more neighboring cameras of the first camera, a second camera as a next node of the first camera. In some embodiments, the server may acquire time instants that the target object enters the FOVs of the neighboring cameras and then determine the neighboring camera corresponding to a particular time instant (e.g., the earliest time instant) as the next node of the first camera.

In some embodiments, the server can determine that the target object enters multiple neighboring cameras (also referred to as the "candidate neighboring cameras") simultaneously and/or substantially simultaneously upon leaving the FOV of the first camera. The server may select, from the candidate neighboring cameras, one or more cameras as the next node of the first camera. For example, the server can determine time instants corresponding to leaving of the FOVs of the candidate neighboring cameras by the target object. The server can then select a candidate neighboring camera corresponding to a particular time instant (e.g., the latest time instant) as the next node of the first camera.

As another example, the server can analyze image data provided by the candidate neighboring camera and determine one or more portions of the image data corresponding to the target object (e.g., one or more regions of one or more images including the target object). The server can further determine, for each of the candidate neighboring cameras, an amount of image data that corresponds to the target object. The amount of image data may be represented using, for example, the number of pixels, the size of an image region, a proportion, etc. The server can select, form the candidate neighboring cameras, a candidate neighboring camera corresponding to a particular amount of image data corresponding to the target object (e.g., the greatest amount, the second greatest amount, etc.) as the next node of the next camera.

As still another example, the server may determine one or more first feature(s) of the target object based on image data provided by the first camera and one or more second features of the target object based on image data provided by each of the candidate neighboring cameras. The server can also compare the first feature(s) and the second feature(s) to determine similarities between the first feature(s) and the second feature(s). In some embodiments, the server can identify particular second feature(s) (e.g., the second feature(s) with the greatest similarity) based on the comparison. The server can select, from the candidate neighboring cameras, a candidate neighbor camera corresponding to the particular second feature(s) as the next node of the first camera.

In some embodiments, the server 110 may identify the next-hop camera in a second predetermined time if the server 110 does not detect the target object in a first predetermined time. The first predetermined time and the second predetermined time may be set by the server 110, cameras 120, or the client terminal 130 by users. In some embodiments, the first predetermined time and the second predetermined time may also be determined by the server 110 or cameras 120 according to previous statistics data automatically. In some embodiments, the server 110 may identify the camera which has tracked the target object in the second predetermined time as the node and update the topological data. In some embodiments, the server 110 may detect the target object in image data captured by multiple cameras continuously.

In some embodiments, the server may conclude the process 1100 if the server 110 does not detect the target object in a predetermine period of time. The predetermined period of time may be determined by the server or a user via the client terminal 130. In some embodiments, the server 1100 may terminate the process 1100 if the server 110 receives a stop command for tracking the target object. The stop command may be sent by a user through the client terminal 130.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, in an iteration, 1110 may be unnecessary and the topology structure may be determined or updated based on default settings of the server 110.

Figure 12:
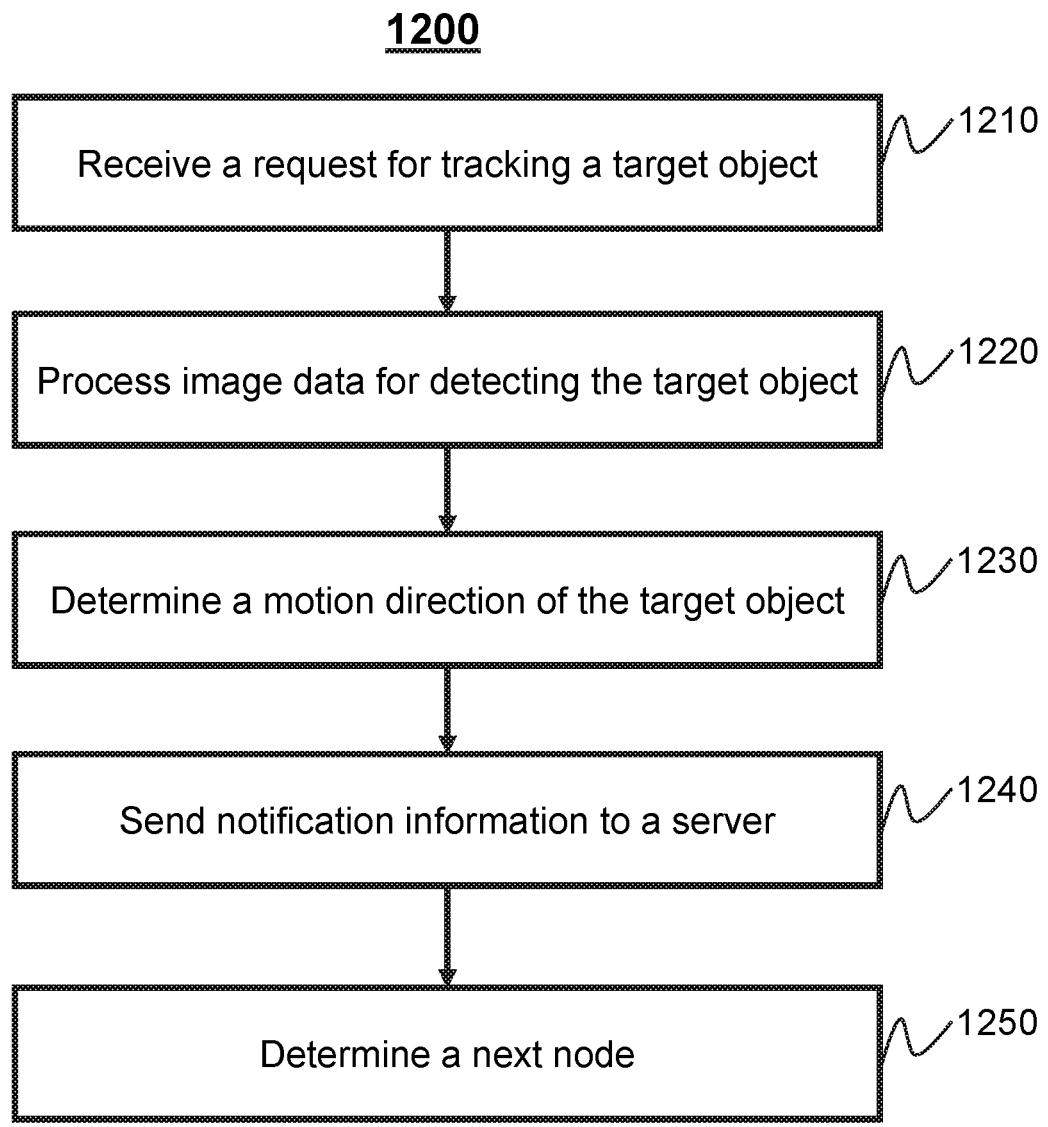
FIG. 12 is a flow chart illustrating an exemplary process for tracking a target object by one or more cameras according to some embodiments of the present disclosure.

FIG. 12 is a flow chart illustrating an exemplary process 1200 for tracking a target object by one or more cameras according to some embodiments of the present disclosure.

In 1210, a first camera (e.g., a camera 120 of FIG. 1) may receive a request for tracking a target object. In some embodiments, the request may include a request signal for tracking the target object and/or features of the target object. In some embodiments, the target object may be selected by a user using a client terminal. In some embodiments, the request may be sent by a server. For example, the server can send the request in response to determining that the target object is to enter the FOV of the first camera. As another example, the server can send the request in response to determining that the first camera is a next node of another camera that has detected the target object. In some embodiments, the request may be sent by a second camera, such as a camera that has detected the target object and/or that determines the first camera as a next node of the second camera.

In 1220, the first camera may process image data for detecting the target object. In some embodiments, the monitoring data may include images and/or videos. In some embodiments, the first camera may compare the features of the target object with features of objects extracted from the image data to detect the target object.

In 1230, the first camera may determine a motion direction of the target object. In some embodiments, the motion direction of the target object may be determined based on one or more regions of the FOV of the first camera via which the target object enters and/or leaves the FOV of the first camera.

In 1240, the first camera may send notification information to a server. In some embodiments, the notification information may include the motion direction, one or more time instants corresponding to an entry into the FOV of the first camera by the target object, one or more time instants corresponding to a departure from the FOV of the first camera by the target object, and/or any other information related to the target object. In some embodiments, the server 110 may determine the current location of the target object and display the images or videos in the client terminal 130. In some embodiments, the server 110 may determine a trajectory of the target object and cause the trajectory to be displayed by the client terminal 130.

In 1250, the first camera may determine a next node based on the motion direction and/or topological data of a camera network. In some embodiments, the first camera may send a request for tracking the target object to the node. The next node may perform operations as described above iteratively.

In some embodiments, the first camera may receive a response from the next node. The response may be generated responsive to the request for tracking the target object sent by the first camera. The response may include an indication of detection of the target object by the next node. The response may also include one or more time instants corresponding to a departure from the FOV of the next node by the target object, time instants corresponding to entry into the FOV of the next node by the target object, etc.

In some embodiments, in response to receiving an indication that the next node has detected the target object, the first camera can determine that the tracking of the target object is performed successfully. Alternatively, the first camera can detect an error in response to receiving an indication that the next node has not detected the target object. The first camera can also update topological data for the first camera and/or a camera system including the first camera upon detecting the error. For example, the first camera can perform one or more operations described in connection with FIGS. 6-12.

In some embodiments, the first camera may conclude process 1200 if the first camera does not detect the target object in a predetermined period of time. In some embodiments, the first camera may terminate process 1200 upon receiving a stop command for tracking the target object. The stop command may be sent by a user through the client terminal 130 or by server 110.

In some embodiments, process 1200 may be executed in an iterative manner to determine topological data for a camera system including multiple cameras (e.g., a global topology structure of the camera system). After the next node is determined based on the motion direction of the target object and the topology structure of all cameras, the next-hop camera may be perform operations as the first camera and then perform the process 1200 as described above.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, in an iteration, 1210 and 1240 may be omitted.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising:
at least one processor configured to perform operations including:
obtaining one or more features of a first target object;
determining a first camera that has detected the first target object based on the one or more features of the first target object;
determining a motion direction of the first target object; and
determining a next node of the first camera based on at least one of the motion direction or topological data related to the first camera, wherein to determine the next node of the first camera, the at least one processor is configured to perform the operations including:
acquiring a plurality of time instants when the first target object enters a plurality of fields of view of a second plurality of neighboring cameras of the first camera;
selecting, from the plurality of time instants, two or more time instants that are the same;
determining a third plurality of neighboring cameras of the second plurality of neighboring cameras corresponding to the two or more time instants;
determining one or more similarities between at least one object detected by the third plurality of neighboring cameras and the first target object; and
determine the next node of the first camera based on the one or more similarities.

2. The system of claim 1, wherein the at least one processor is further configured to perform the operations including:
obtaining image data related to the first target object; and
detecting the first target object in the image data based on a user selection or at least one of the one or more features of the first target object.

3. The system of claim 1, wherein each of the one or more features corresponds to one or more portions of image data related to the first target object.

4. The system of claim 1, wherein to determine the motion direction of the first target object, the at least one processor is configured to perform the operations including:

dividing a first field of view of the first camera into a plurality of regions;
identifying a first region of the plurality of regions through which the first target object departs from the first field of view; and
determining, based on the first region, the motion direction of the first target object in the first field of view of the first camera.

5. The system of claim 4, wherein to divide the first field of view of the first camera into a plurality of regions, the at least one processor is configured to perform the operations including:
identifying edges of the first field of view of the first camera; and
dividing the edges of the first field of view of the first camera into a plurality of regions.

6. The system of claim 1, wherein to determine the next node of the first camera based on at least one of the motion direction or topological data related to the first camera, the at least one processor is configured to perform the operations including:
determining, based on the topological data, a neighboring camera of the first camera that corresponds to the motion direction; and
designating the neighboring camera as the next node of the first camera.

7. The system of claim 1, wherein the topological data related to the first camera is generated according to a process including:
detecting a second target object in image data provided by the first camera;
determining a first plurality of neighboring cameras of the first camera that have detected the second target object;
determining at least one of the first plurality of neighboring cameras as a next node of the first camera; and
generating the topological data for the first camera and the next node of the first camera.

8. The system of claim 7, wherein each of the first plurality of neighboring cameras is connected to the first camera via at least a threshold number of intermediate devices.

9. The system of claim 1, wherein to determine the one or more similarities, the at least one processor is configured to perform the operations including:
determining the one or more similarities between the at least one detected object and the first target object by comparing at least one feature of the at least one detected object and at least one of the one or more features of the first target object.

10. The system of claim 1, wherein the at least one processor is further configured to perform the operations including:
obtaining image data from the next node of the first camera; and
determining whether the next node has detected the first target object by analyzing the image data obtained from the next node.

11. A method implemented on a computing device having at least one processor and at least one computer-readable storage medium, the method comprising:
obtaining one or more features of a first target object;
determining a first camera that has detected the first target object based on the one or more features of the first target object;
determining a motion direction of the first target object; and
determining a next node of the first camera based on at least one of the motion direction or topological data related to the first camera, wherein determining the next node of the first camera includes:
acquiring a plurality of time instants when the first target object enters a plurality of fields of view of a second plurality of neighboring cameras of the first camera;
selecting, from the plurality of time instants, two or more time instants that are the same;
determining a third plurality of neighboring cameras of the second plurality of neighboring cameras corresponding to the two or more time instants;
determining one or more similarities between at least one object detected by the third plurality of neighboring cameras and the first target object; and
determine the next node of the first camera based on the one or more similarities.

12. The method of claim 11, further including:
obtaining image data related to the first target object; and
detecting the first target object in the image data based on a user selection or at least one of the one or more features of the first target object.

13. The method of claim 11, wherein determining the motion direction of the first target object includes:
dividing a first field of view of the first camera into a plurality of regions;
identifying a first region of the plurality of regions through which the first target object departs from the first field of view; and
determining, based on the first region, the motion direction of the first target object in the first field of view of the first camera.

14. The method of claim 13, wherein dividing the first field of view of the first camera into a plurality of regions includes:
identifying edges of the first field of view of the first camera; and
dividing the edges of the first field of view of the first camera into a plurality of regions.

15. The method of claim 11, wherein determining the next node of the first camera based on at least one of the motion direction or topological data related to the first camera includes:
determining, based on the topological data, a neighboring camera of the first camera that corresponds to the motion direction; and
designating the neighboring camera as the next node of the first camera.

16. The method of claim 11, wherein the topological data related to the first camera is generated according to a process including:
detecting a second target object in image data provided by the first camera;
determining a first plurality of neighboring cameras of the first camera that have detected the second target object;
determining at least one of the first plurality of neighboring cameras as a next node of the first camera; and
generating the topological data for the first camera and the next node of the first camera.

17. The method of claim 11, wherein determining the one or more similarities includes:
determining the one or more similarities between the at least one detected object and the first target object by comparing at least one feature of the at least one detected object and at least one of the one or more features of the first target object.

18. A non-transitory computer readable medium, comprising at least one set of instructions, wherein when executed by at least one processor of a computing device, the at least one set of instructions causes the computing device to perform a method, the method comprising:
  obtaining one or more features of a first target object;
  determining a first camera that has detected the first target object based on the one or more features of the first target object;
  determining a motion direction of the first target object; and
determining a next node of the first camera based on at least one of the motion direction or topological data related to the first camera, wherein determining the next node of the first camera includes:
    acquiring a plurality of time instants when the first target object enters a plurality of fields of view of a second plurality of neighboring cameras of the first camera;
    selecting, from the plurality of time instants, two or more time instants that are the same;
    determining a third plurality of neighboring cameras of the second plurality of neighboring cameras corresponding to the two or more time instants;
    determining one or more similarities between at least one object detected by the third plurality of neighboring cameras and the first target object; and
    determine the next node of the first camera based on the one or more similarities.

* * * * *